United States Patent
Sridhara et al.

(10) Patent No.: US 8,385,288 B2
(45) Date of Patent: Feb. 26, 2013

(54) MULTI-CHANNEL SDMA

(75) Inventors: Vinay Sridhara, Santa Clara, CA (US); Santosh P. Abraham, San Diego, CA (US); Hemanth Sampath, San Diego, CA (US); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 12/543,840

(22) Filed: Aug. 19, 2009

(65) Prior Publication Data

US 2010/0046482 A1    Feb. 25, 2010

Related U.S. Application Data

(60) Provisional application No. 61/090,518, filed on Aug. 20, 2008.

(51) Int. Cl.
*H04W 4/00* (2009.01)
(52) U.S. Cl. .................................. 370/330; 455/562.1
(58) Field of Classification Search .................. None
See application file for complete search history.

(56) References Cited

U.S. PATENT DOCUMENTS

| | | | |
|---|---|---|---|
| 2005/0147023 A1 | 7/2005 | Stephens et al. | |
| 2006/0040709 A1* | 2/2006 | Adachi et al. | 455/562.1 |
| 2008/0002621 A1* | 1/2008 | Ginzburg et al. | 370/331 |
| 2008/0020751 A1* | 1/2008 | Li et al. | 455/424 |
| 2008/0072269 A1* | 3/2008 | Malladi et al. | 725/110 |
| 2011/0216711 A1* | 9/2011 | Onodera et al. | 370/329 |

FOREIGN PATENT DOCUMENTS

| | | |
|---|---|---|
| EP | 1339245 | 8/2003 |
| WO | WO0249305 | 6/2002 |
| WO | WO2007074452 | 7/2007 |
| WO | WO2008011320 | 1/2008 |

OTHER PUBLICATIONS

International Search Report and Written Opinion—PCT/US2009/054499, International Search Authority, European Patent Office, Dec. 7, 2009.

* cited by examiner

*Primary Examiner* — Jianye Wu
(74) *Attorney, Agent, or Firm* — Kevin T. Cheatham

(57) ABSTRACT

Certain embodiments provide a method for scheduling packet transmissions in a multi-channel wireless communications system. The method generally includes requesting, from a plurality of wireless network nodes, an identification of channels available for communicating with the wireless network nodes, receiving an identification of channels available for communicating with the wireless network nodes, determining a schedule for packet transmission for the wireless network nodes based on the identification of channels, and communicating the schedule to the wireless network nodes.

42 Claims, 7 Drawing Sheets

MULTI-CHANNEL SDMA

CROSS-REFERENCE TO RELATED APPLICATION

This application claims benefit of U.S. Provisional Patent Application Ser. No. 61/090,518 filed Aug. 20, 2008, which is herein incorporated by reference in its entirety.

BACKGROUND

In order to address the issue of increasing bandwidth requirements that are demanded for wireless communications systems, different schemes are being developed to allow multiple user terminals to communicate with a single base station by sharing the same channel (same time and frequency resources) while achieving high data throughputs. One such scheme is spatial division multiple access (SDMA).

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of antennas separated in space, and the combined received signals from multiple antennas may be split into independent signals transmitted from each user terminal by applying the appropriate signal processing technique.

A multiple-input multiple-output (MIMO) wireless system employs multiple ($N_T$) transmit antennas and multiple ($N_R$) receive antennas for data transmission. A MIMO channel formed by the $N_T$ transmit and $N_R$ receive antennas may be decomposed into $N_S$ spatial channels, where $N_S \leq \min\{N_T, N_R\}$. The $N_S$ spatial channels may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes one antenna for data transmission and multiple antennas for data reception.

SUMMARY

Certain embodiments provide a method for scheduling packet transmissions in a multi-channel wireless communications system. The method generally includes receiving an identification of channels available for communicating simultaneously with a plurality of wireless network nodes via a spatial division multiple access (SDMA) scheme, determining a schedule for packet transmission for the wireless network nodes based on the identification of channels, and transmitting downlink packets to at least some of the wireless network nodes simultaneously via the SDMA scheme according to the schedule.

Certain embodiments provide a method for scheduling packet transmissions in a multi-channel wireless communications system. The method generally includes sending an identification of one or more channels available for communicating with the wireless network nodes as an uplink spatial division multiple access (SDMA) transmission and receiving a downlink SDMA transmission on at least one of the identified communications channels.

Certain embodiments provide a method for scheduling packet transmissions in a multi-channel wireless communications system. The method generally includes receiving an identification of channels available for communicating with a plurality of wireless network nodes, determining a schedule for packet transmission for the wireless network nodes based on the identification of channels, and communicating the schedule to the wireless network nodes.

Certain embodiments provide a method for scheduling packet transmissions in a multi-channel wireless communications system. The method generally includes sending an identification of one or more channels available for communicating with the wireless network, receiving a schedule for communicating with the wireless network generated based on the identification of channels, and communicating with the wireless network according to the schedule.

Certain embodiments provide an apparatus for scheduling packet transmissions in a multi-channel wireless communications system. The apparatus generally includes means for receiving an identification of channels available for communicating simultaneously with a plurality of wireless network nodes via a spatial division multiple access (SDMA) scheme, means for determining a schedule for packet transmission for the wireless network nodes based on the identification of channels, and means for transmitting downlink packets to at least some of the wireless network nodes simultaneously via the SDMA scheme according to the schedule.

Certain embodiments provide an apparatus for scheduling packet transmissions in a multi-channel wireless communications system. The apparatus generally includes means for sending an identification of one or more channels available for communicating with the wireless network nodes as an uplink spatial division multiple access (SDMA) transmission, and means for receiving a downlink SDMA transmission on at least one of the identified communications channels.

Certain embodiments provide an apparatus for scheduling packet transmissions in a multi-channel wireless communications system. The apparatus generally includes means for receiving an identification of channels available for communicating with a plurality of wireless network nodes, means for determining a schedule for packet transmission for the wireless network nodes based on the identification of channels, and means for communicating the schedule to the wireless network nodes.

Certain embodiments provide an apparatus for scheduling packet transmissions in a multi-channel wireless communications system. The apparatus generally includes means for sending an identification of one or more channels available for communicating with the wireless network, means for receiving a schedule for communicating with the wireless network generated based on the identification of channels, and means for communicating with the wireless network according to the schedule.

Certain embodiments provide an apparatus for scheduling packet transmissions in a multi-channel wireless communications system. The apparatus generally includes a receiver configured to receive an identification of channels available for communicating simultaneously with a plurality of wireless network nodes via a spatial division multiple access (SDMA) scheme, a scheduler configured to determine a schedule for packet transmission for the wireless network nodes based on the identification of channels, and a transmitter configured to transmit downlink packets to at least some of the wireless network nodes simultaneously via the SDMA scheme according to the schedule.

Certain embodiments provide an apparatus for scheduling packet transmissions in a multi-channel wireless communications system. The apparatus generally includes a transmitter configured to send an identification of one or more channels available for communicating with the wireless network nodes as an uplink spatial division multiple access (SDMA) transmission and a receiver configured to receive a downlink SDMA transmission on at least one of the identified communications channels.

Certain embodiments provide an apparatus for scheduling packet transmissions in a multi-channel wireless communications system. The apparatus generally includes a receiver configured to receive an identification of channels available for communicating with a plurality of wireless network nodes, a scheduler configured to determine a schedule for packet transmission for the wireless network nodes based on the identification of channels, and logic configured to communicate the schedule to the wireless network nodes.

Certain embodiments provide an apparatus for scheduling packet transmissions in a multi-channel wireless communications system. The apparatus generally includes a transmitter configured to send an identification of one or more channels available for communicating with the wireless network, a receiver configured to receive a schedule for communicating with the wireless network generated based on the identification of channels, and logic configured to communicate with the wireless network according to the schedule.

Certain embodiments provide a computer-program product for scheduling packet transmissions in a multi-channel wireless network comprising a computer readable medium having instructions stored thereon, the instructions being executable by one or more processors. The instructions generally include instructions for receiving, from a plurality of wireless network nodes, an identification of channels available for communicating with the wireless network nodes, determining a schedule for packet transmission for the wireless network nodes based on the identification of channels, and communicating the schedule to the wireless network nodes.

Certain embodiments provide a computer-program product for scheduling packet transmissions in a multi-channel wireless network comprising a computer readable medium having instructions stored thereon, the instructions being executable by one or more processors. The instructions generally include instructions for sending an identification of one or more channels available for communicating with the wireless network, receiving a schedule for communicating with the wireless network generated based on the identification of channels, and communicating with the wireless network according to the schedule.

Certain embodiments provide a computer-program product for scheduling packet transmissions in a multi-channel wireless network comprising a computer readable medium having instructions stored thereon, the instructions being executable by one or more processors. The instructions generally include instructions for receiving an identification of channels available for communicating with a plurality of wireless network nodes, determining a schedule for packet transmission for the wireless network nodes based on the identification of channels, and communicating the schedule to the wireless network nodes.

Certain embodiments provide a computer-program product for scheduling packet transmissions in a multi-channel wireless network comprising a computer readable medium having instructions stored thereon, the instructions being executable by one or more processors. The instructions generally include instructions for sending an identification of one or more channels available for communicating with the wireless network, receiving a schedule for communicating with the wireless network generated based on the identification of channels, and communicating with the wireless network according to the schedule.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) subbands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

Figure 1:
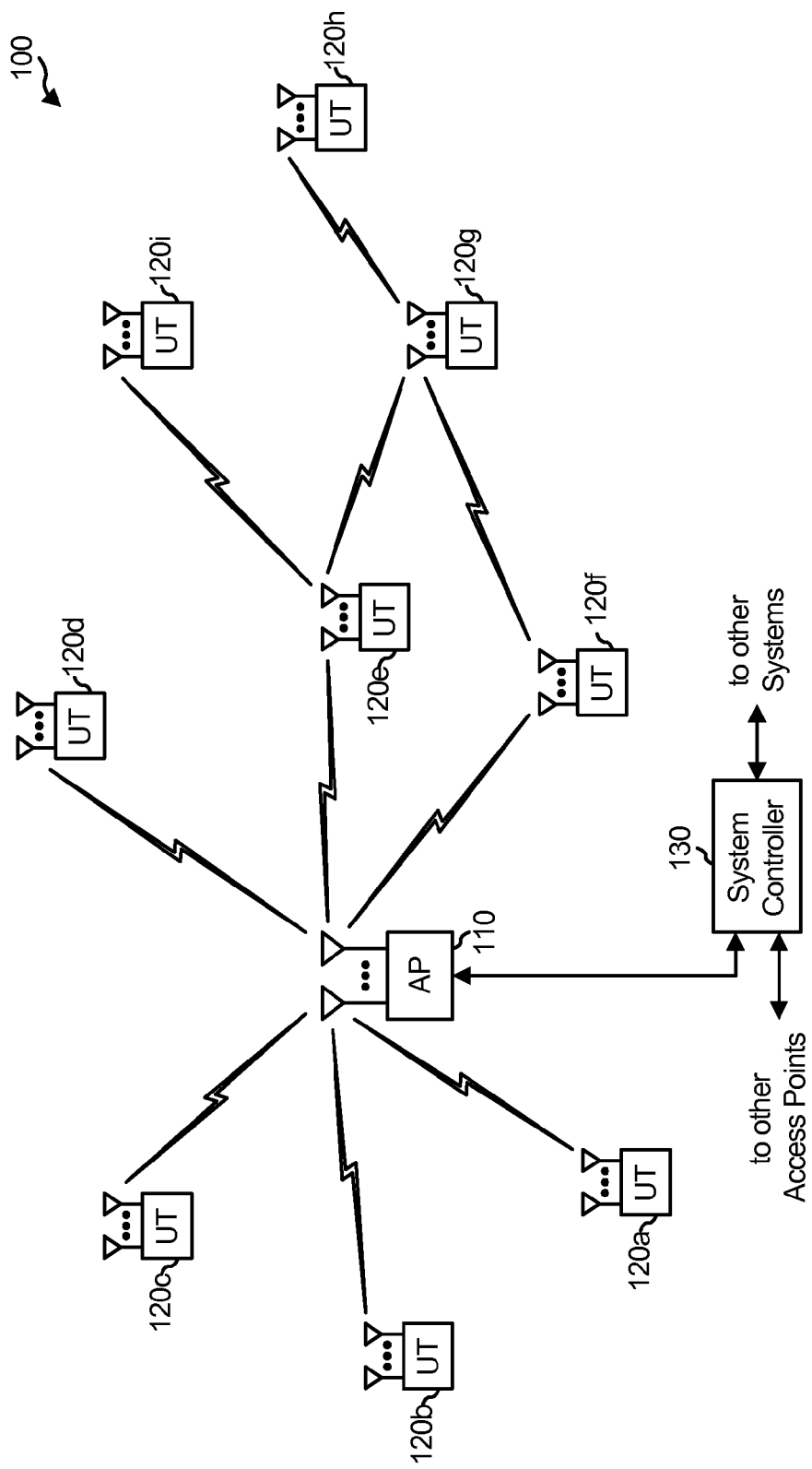
FIG. 1 shows a spatial division multiple access MIMO wireless system in accordance with certain embodiments of the present disclosure.

FIG. 1 shows a multiple-access MIMO system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via SDMA, for certain embodiments, the user terminals 120 may also include some user terminals that do not support SDMA. Thus, for such embodiments, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of $N_u$ selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
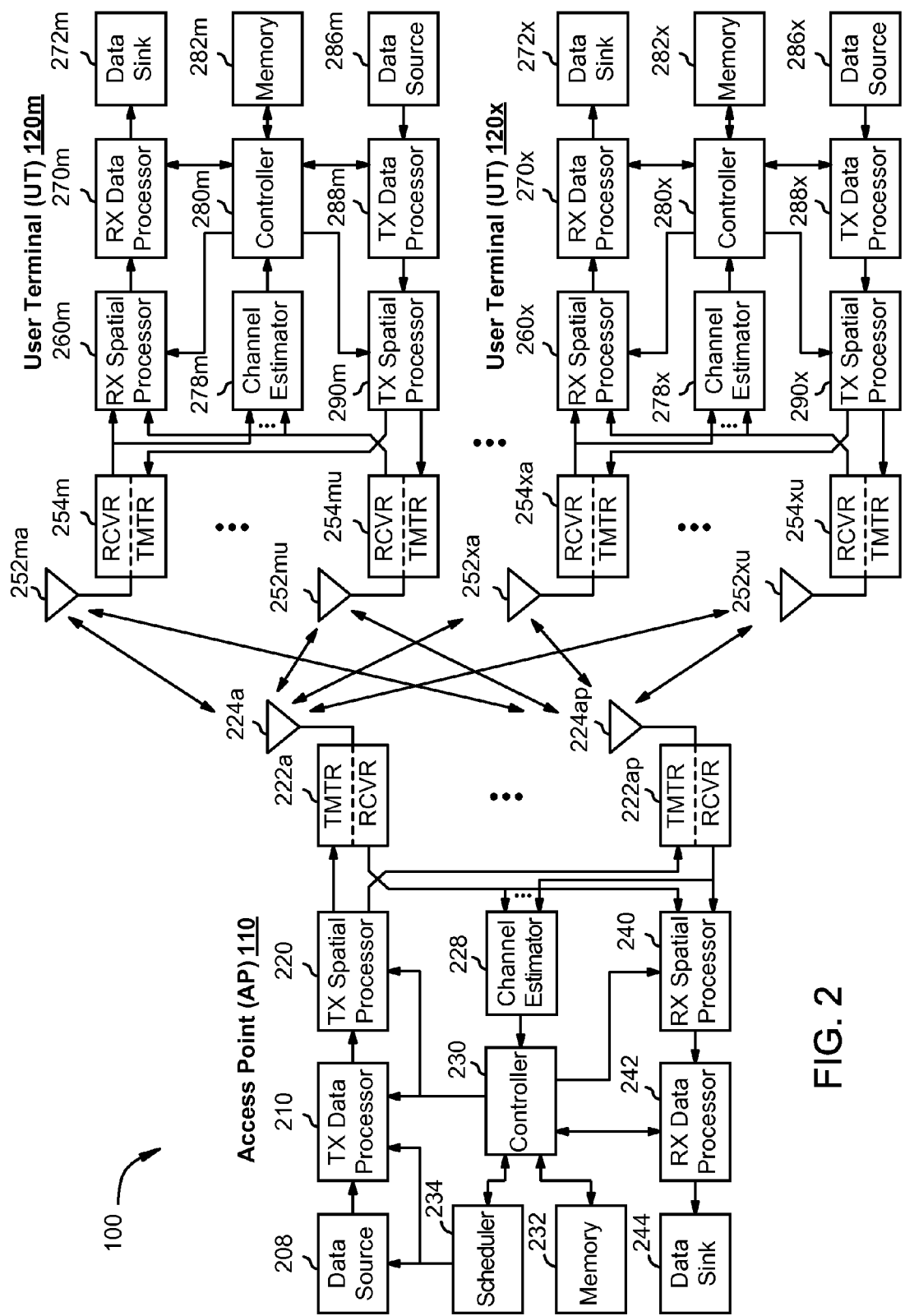
FIG. 2 shows a block diagram of an access point and two user terminals in accordance with certain embodiments of the present disclosure.

FIG. 2 shows a block diagram of access point 110 and two user terminals 120*m* and 120*x* in MIMO system 100. Access point 110 is equipped with $N_{ap}$ antennas 224*a* through 224*ap*. User terminal 120*m* is equipped with $N_{ut,m}$ antennas 252*ma* through 252*mu*, and user terminal 120*x* is equipped with $N_{ut,x}$ antennas 252*xa* through 252*xu*. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{ap}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$ A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224*a* through 224*ap* receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink steering vectors, SNR estimates, and so on) to the access point. Controllers 230 and 280 also control the operation of various processing units at access point 110 and user terminal 120, respectively.

Figure 3:
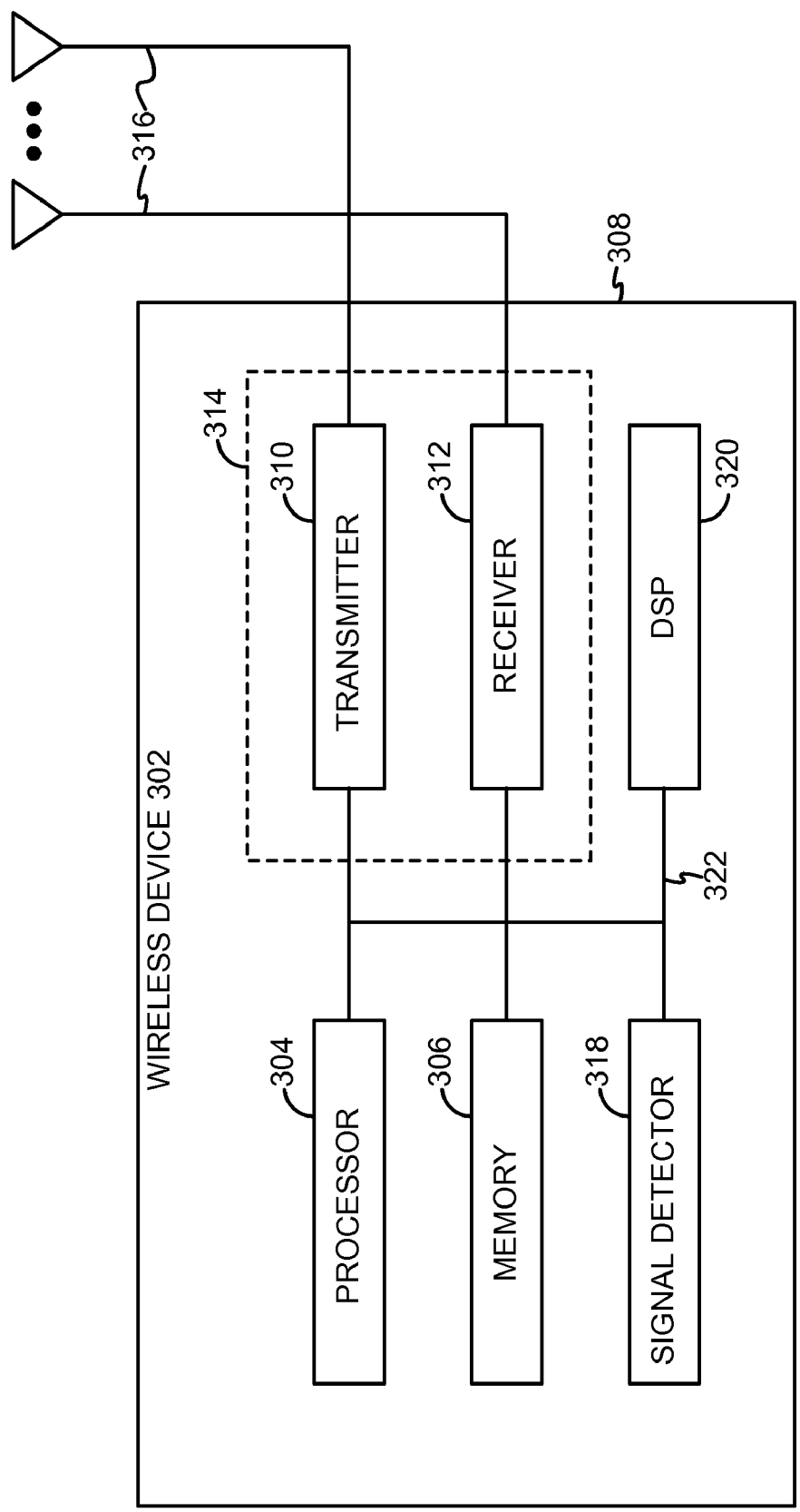
FIG. 3 illustrates example components of a wireless device in accordance with certain embodiments of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logic and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus . . .

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

Multichannel SDMA

SDMA may be used for improving utilization of the air link by scheduling multiple terminals for simultaneous transmission and reception using multiple channels. Data may be sent to each of the terminals using spatial streams. Certain embodiments of the present disclosure provide a protocol for efficient scheduling of the spatial streams for multiple terminals over multiple channels.

When considering the unlicensed spectrum available for the 802.11 wireless local area network (WLAN) systems, there is a significant amount of bandwidth available for the packet transmissions. Typically the bandwidth is split into different channels that are 20 MHz wide. If there is more than one single channel free in a distribution system, better utilization of this resource will enable higher aggregate throughputs. Certain embodiments of the present disclosure provide a methodology (protocol) for combining SDMA with the use of multiple channels to enhance the overall aggregate network throughput.

According to certain aspects, the protocol presented in the present disclosure allows an AP to determine a schedule for use in communicating with a plurality of wireless nodes (e.g., stations) over a plurality of wireless channels. In other words, the schedule may identify which, of the plurality of wireless nodes, communicate on which channels. According to certain aspects, the protocol may also provide for training of stations, wherein the AP may utilize sounding signals received from the stations to determine channel information for each station. The AP may use this channel information to optimize subsequent downlink SDMA transmissions to the stations.

Figure 4:
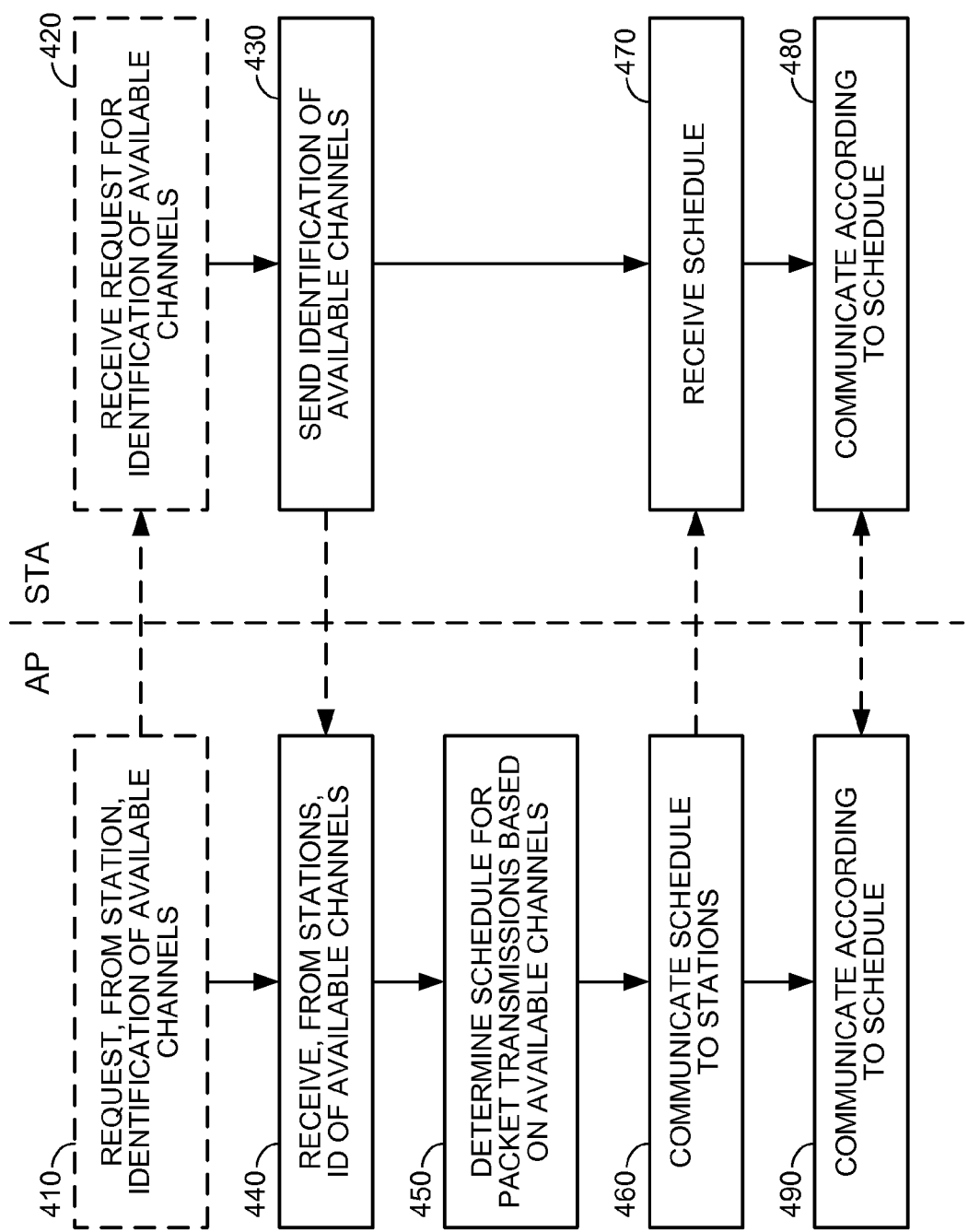
FIG. 4 illustrates example operations for scheduling transmissions in an SDMA system in accordance with certain embodiments of the present disclosure.

FIG. 4 illustrates example operations for scheduling transmissions in an SDMA system for multiple users over multiple channels in a wireless LAN system, according to certain embodiments of the present disclosure. FIG. 4 illustrates operations that may performed by both the access points and operations performed by stations. In SDMA systems, the station operations may be performed simultaneously by multiple stations. The illustrated operations may be performed by any suitable components, such as those described above with reference to FIG. 3.

For the sake of illustration, the operations of FIG. 4 are described below in conjunction with example timing diagrams illustrated in FIGS. 5 and 6. The operations begin, at 410, where an access point (AP) sends a request to stations (STAs) for identification of available channels. For example, the request may take the form of a free channel request message (FCRM) 502 shown in FIGS. 5 and 6.

At 420, the request is received by the STAs. At 430, each STA sends an identification of available channels. At 440, the identification of available channels sent by each STA is received by the AP. At 450, the AP determines a schedule for packet transmissions based, at least in part, on the available channels. At 460, the AP communicates the schedule to the STAs. At 470, the schedule is received by the STAs. At 480 and 490, the AP and STAs communicate according to the schedule.

For certain embodiments, the AP may not need to send a request in order to receive free channel information from the stations. Thus, operations 410 and 420 may be considered optional. For such embodiments, stations may send their free channel information periodically, or in response to some other triggering mechanism, such as when a new available channel is detected.

Figure 5:
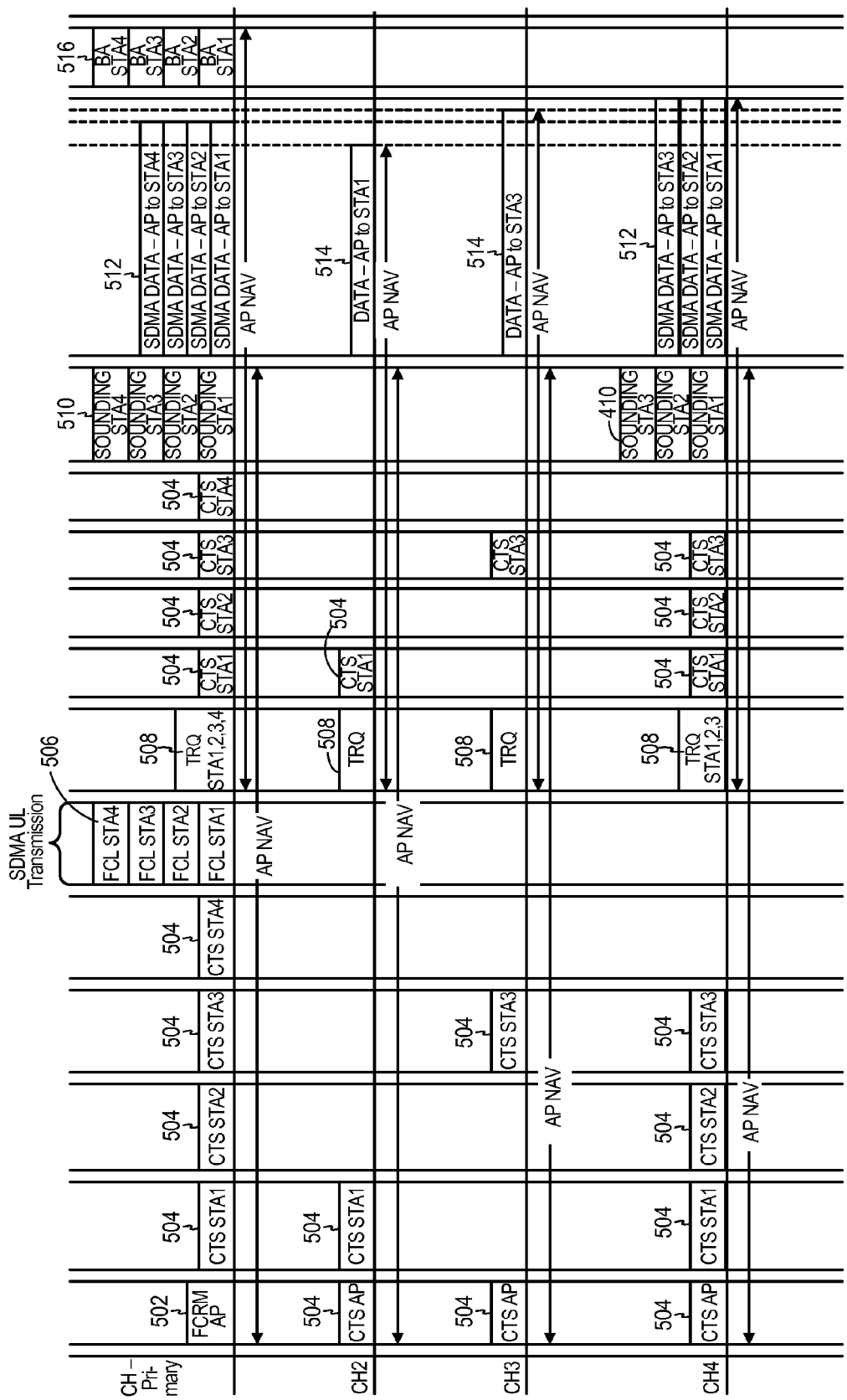
FIGS. 5 and 6 are example timing diagrams showing example message flows for scheduling transmissions in an SDMA system.
Figure 6:
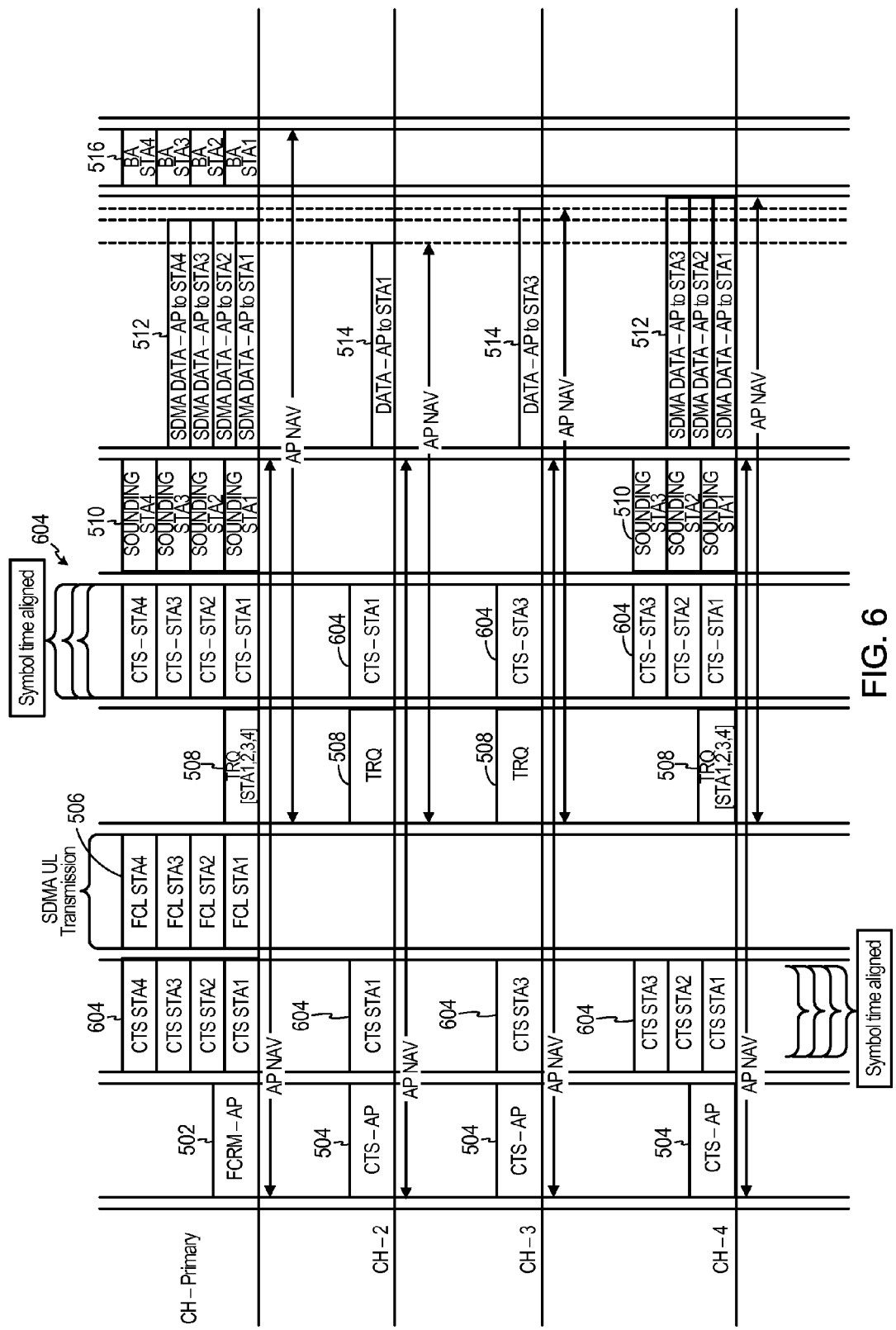

FIGS. 5 and 6 illustrate example wireless communications between an AP and a plurality of stations (STA1, STA2, STA3, and STA4) using a plurality of wireless channels (a primary channel CH1, CH2, CH3, and CH4). In the figures, the horizontal axes correspond to the different wireless channels. In order to identify which entity is transmitting a particular message, a label is included in the box representing each message. As an example, the label "AP" in the box 502 representing the free channel request message (FCRM) indicates the AP transmits the FCRM 502, while separate labels for "STA1," STA2," "STA3," and "STA4" in boxes 504 representing a clear to send frame (CTS) indicate that each of the different stations transmits a CTS frame 504.

FIG. 5 is a timing diagram illustrating an example of scheduling SDMA transmissions for multiple users, in accordance with certain embodiments. In the illustrated example, stations respond with "staggered" clear to send (CTS) frames 504, meaning stations send the CTS frames are different times.

The illustrated example assumes the following. The AP can transmit different packets on different channels simultaneously, can transmit packets on non-contiguous channels, and sees all four free channels 1, 2, 3, and 4. Station 1 sees channels 1, 2, and 4, Station 2 sees channels 1 and 4, Station 3 sees channels 1, 3, and 4, while Station 4 sees channel 1 only. Thus, an optimal schedule may be for the AP to use Channel 1 for SDMA communication with all stations, Channel 2 for communication with Station 2, Channel 3 for communication with Station 3, and Channel 4 for SDMA communication with Stations 1, 2 and 3.

As shown in the example, the AP sends a Free channel request message (FCRM) 502, which may be a multicast message for a specific set of nodes (e.g., with the nodes identified in a MAC header). The FCRM 502 may also contain information regarding the free channels seen by the AP (e.g., as a free channel list-FCL). The FCRM may also contain information indicating when the nodes are to respond with their respective FCL (e.g., in a Free Channel List Message 506).

According the certain aspects, the AP may also send a clear to send (CTS) message 504 to itself (CTS to self) on all the identified free channels, to secure those channels for the exchange for the necessary amount of time. As illustrated, the FCRM and CTS messages sent by the AP may have a duration field setting that results in NAV settings (for the AP and stations) to protect the channels long enough to receive free channel list and sounding information from all the stations.

In response to the FCRM 502 sent by the AP, each STA may also send a CTS 504 to itself on all the free channels that station sees. This mechanism may help ensure that these channels are reserved for a period of time until the AP sends a training request (TRQ 408) and all the stations respond with a sounding frame 510. If there are nodes which identify the same channel as free, they may perform some type of arbitration, for example, sending the CTS to themselves in a staggered fashion with the order for each station determined by their station ID.

In the illustrated example, since all stations see the primary channel (channel 1), the stations each send staggered CTSs 504 on the primary channel, illustratively in order of station number. Similarly, as Stations 1, 2, and 3, all see Channel 4, these stations each send staggered CTSs 504 on Channel 4, as well. Since Station 1 is the only station to see Channel 2, it is the only station to send a CTS 504 on Channel 2. Similarly, as Station 3 is the only station to see Channel 3, it is the only station to send a CTS 504 on Channel 3. As illustrated, in this example, each station may send its CTS 504 on each channel at the same time specified for staggering.

To help the AP determine a schedule for communication with the stations on the multiple channels, the stations may provide an indication of the channels they see (their "available channels") in an FCL message 506 to the AP. As illustrated, for certain embodiments, the FCL message 506 from each station may be transmitted on the (same) primary channel as an SDMA uplink transmission. Such scheduling of the FCL messages 506 may be specified by the AP in the FCRM 502. For example, the FCRM may contain information indicating whether the stations should send their FCL messages 506 as an SDMA UL transmission (as shown) or in a staggered fashion.

Upon receiving all the FCL messages 506 from the STAs, the AP may compute schedules indicating the packet transmission for different responding STAs, based on the "available channels" for each station indicated in the free channel lists. The AP may then send some type of multichannel message on all the free channels to reserve these channels around the AP. Such a message may be chosen to be "legacy compatible," in terms of network allocation vector (NAV) setting capabilities such that stations that are not SDMA-capable may still adjust their NAV settings accordingly. The NAV of the multicast request message should protect the primary channel until all the block acknowledgements (BAs) 516 are received. The NAV settings on the secondary channels (CH2-CH4) may also be set to protect those channels for the duration of their respective packet transmissions.

According to certain aspects, the multi-channel request message may take the form of training request messages (TRQs) 508. As with the FCRM 502, according to certain aspects, the stations may respond the TRQs 508 with staggered CTSs 504.

As shown, the TRQs 508 may be sent on the free channels that are available to multiple stations. The stations receiving the TRQs 508 may respond by transmitting sounding signals 510. The AP may utilize the sounding signals to determine channel information for each station, which may be used to optimize subsequent SDMA transmissions 512. For certain embodiments, the CTS and sounding frames may be kept separate, as illustrated, which may allow the format of these messages to be combatable with legacy stations.

After training, the AP may send data to the stations. As illustrated, the AP may send data simultaneously via SDMA transmissions 512 to Stations 1-4 on the primary channel. Since Stations 1-3 all see Channel 4, the AP may send data to these stations via SDMA transmissions 512 on Channel 4. The AP may send data via (non-SDMA) transmissions 514 to Station 1 on Channel 2 and to Station 3 on Channel 3, as these are the only stations that see these respective channels. As illustrated, the stations may acknowledge receipt of the data via block acknowledgements (BAs) 516. According to certain aspects, the schedules for the BAs 516 may be carried in the MAC header (of the SDMA data transmissions 512). As illustrated, all the SDMA stations may reply with a BA 516 as an UL SDMA transmission on the primary channel.

FIG. 6 is a timing diagram illustrating another example of scheduling SDMA transmissions where it is assumed that symbol time of multiple stations is aligned (e.g., symbols sent from multiple stations arrive at the AP substantially aligned). Other assumptions for FIG. 6, regarding channel availability to the AP and per station are the same as in FIG. 5.

Again, the AP sends an FCRM 502, which may be a multicast message for a specific set of nodes and may also contain information regarding the free channels seen by the AP. Due to the symbol time alignment, however, rather than send staggered CTSs 504, as in FIG. 5, stations may send CTS messages 604 simultaneously on the same channel. As illustrated, Stations 1-4 send simultaneous CTS messages 604 on the primary channel (Channel 1) while Stations 1-3 send simultaneous CTS messages 604 on Channel 4. While Station 1 and Station 3 are the only stations that send CTS messages 604 on Channel 2 and Channel 3, respectively, they may also do so simultaneously.

As illustrated, simultaneous CTS messages 604 may again be sent in response to the TRQ messages 508 sent by the AP after receiving the FCL messages 506. Thus, in the symbol aligned case, the overall transaction time may be significantly reduced by eliminating the need for staggered CTS messages.

Figure 4A:
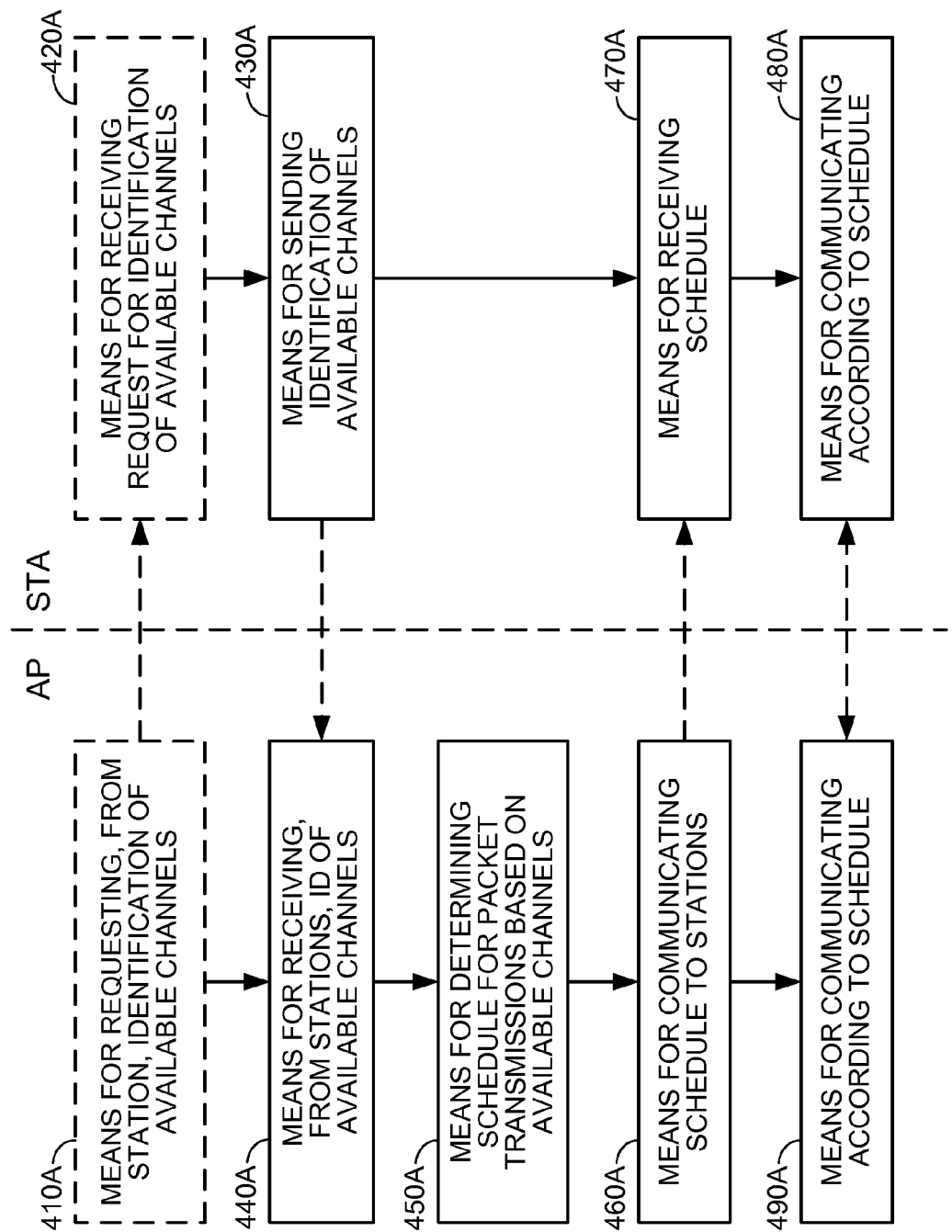
FIG. 4A illustrates example components capable of performing the operations shown in FIG. 4.

The various operations of methods described above may be performed by various hardware and/or software component(s), logic, and/or module(s) corresponding to means-plus-function blocks illustrated in the figures. Generally, where there are methods illustrated in figures any suitable means having corresponding counterpart means-plus-function figures, the operation blocks correspond to means-plus-function blocks with similar numbering. For example, operations 410-480 shown in FIG. 4 may be performed by means 410A-480A shown in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logic blocks, modules and circuits described in connection with the present disclosure may be implemented or performed with a general purpose processor, a digital signal processor (DSP), an application specific integrated circuit (ASIC), a field programmable gate array signal (FPGA) or other programmable means device (PLD), discrete gate or transistor means, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for scheduling packet transmissions in a multi-channel wireless communications system, comprising:
   receiving an identification of channels available for communicating simultaneously with a plurality of wireless network nodes via a spatial division multiple access (SDMA) scheme;
   determining a schedule for packet transmission for the plurality of wireless network nodes based on the identification of the available channels and selection of the available channels by the wireless communications system;
   transmitting the schedule to each of the plurality of wireless network nodes;
   transmitting downlink packets to one or more of the wireless network nodes on a first channel simultaneously via the SDMA scheme and according to the transmitted schedule; and
   transmitting downlink packets to at least one of the wireless network nodes on a second channel according to the transmitted schedule, wherein the downlink packets are transmitted on the second channel simultaneously with the downlink packets transmitted on the first channel.

2. The method of claim 1, further comprising:
   sending a request message, to the plurality of wireless network nodes, for the identification of the channels available for communicating simultaneously with the plurality of wireless network nodes; and
   receiving, over a shared primary channel, the identification of channels available for communicating with the plurality of wireless network nodes in response to the request message.

3. The method of claim 1, further comprising:
   transmitting a first schedule for packet transmission to a first wireless network node, the first schedule indicating one or more channels selected by the wireless communications system to communicate with the first wireless network node.

4. The method of claim 2, wherein the request message contains information indicating multiple wireless nodes should respond to the request message with responses staggered in time.

5. The method of claim 2, wherein the request message contains information indicating multiple wireless nodes should respond to the request message simultaneously.

6. The method of claim 1, further comprising:
   receiving a list of available channels from multiple nodes on a single primary communications channel simultaneously as an uplink SDMA transmission.

7. The method of claim 1, wherein transmitting the downlink packets to the at least one wireless network node on the second channel further comprises transmitting the downlink packets simultaneously to at least two of the wireless network nodes on the second channel via the SDMA scheme.

8. The method of claim 1, further comprising:
   receiving acknowledgement messages from multiple nodes on a single primary communications channel simultaneously as an uplink SDMA transmission.

9. A method for exchanging packet transmissions in a multi-channel wireless communications system, comprising:
   sending an identification of one or more channels available for communicating with a plurality of wireless network nodes as an uplink spatial division multiple access (SDMA) transmission;
   receiving a schedule based on the one or more channels identified; and
   receiving a downlink SDMA transmission on at least one of the identified channels.

10. The method of claim 9, further comprising receiving a request message requesting the identification of one or more channels available for communicating with the wireless network nodes.

11. The method of claim 10, wherein the request message comprises at least one of a multicast message or a broadcast message transmitted to multiple wireless network nodes.

12. The method of claim 10, wherein the request message contains information indicating multiple wireless nodes should respond to the request message simultaneously.

13. The method of claim 10, wherein the request message contains information indicating multiple wireless nodes should respond to the request message with responses staggered in time.

14. The method of claim 10, wherein the request message indicates the identification of channels from multiple nodes should be sent on a single primary communications channel.

15. The method of claim 10, further comprising:
   responding to the request message with a clear to send (CTS) message having a format compatible with one or more of the IEEE 802.11 family of standards.

16. A method for scheduling packet transmissions in a multi-channel wireless network, comprising:
   receiving an uplink spatial division multiple access (SDMA) transmission identifying channels available for communicating with a plurality of wireless network nodes;
   determining schedules indicating packet transmissions for different wireless network nodes among the plurality of wireless network nodes based on the identified available channels, wherein the schedules are determined based on the available channels identified by a corresponding wireless network node and available channels identified by other wireless network nodes; and
   communicating the schedules to the wireless network nodes.

17. A method for exchanging packet transmissions in a multi-channel wireless network, comprising:
   sending, from at least one wireless network node, an identification of two or more channels available for communicating with the wireless network;
   receiving a schedule for communicating with the wireless network from the wireless network, the received schedule generated based on the identification of the two or more available channels; and
   communicating between the at least one wireless network node and the wireless network on at least two of the identified two or more available channels simultaneously according to the received schedule.

18. An apparatus for scheduling packet transmissions in a multi-channel wireless communications system, comprising:
   means for receiving an identification of channels available for communicating simultaneously with a plurality of wireless network nodes via a spatial division multiple access (SDMA) scheme;
   means for determining a schedule for packet transmission for the plurality of wireless network nodes based on the identification of the available channels;
   means for transmitting the schedule to each of the plurality of wireless network nodes;
   means for transmitting downlink packets to one or more of the wireless network nodes on a first channel simultaneously via the SDMA scheme and according to the transmitted schedule; and means for transmitting downlink packets to at least one of the wireless network nodes on a second channel according to the transmitted schedule, wherein the downlink packets are transmitted on the second channel simultaneously with the downlink packets transmitted on the first channel.

19. The apparatus of claim 18, further comprising means for sending a request message, to the plurality of wireless network nodes, for the identification of the channels available for communicating simultaneously with the plurality of wireless network nodes.

20. The apparatus of claim 18, further comprising:
means for transmitting a first schedule for packet transmission to a first wireless network node, the first schedule indicating one or more channels selected by the wireless communications system to communicate with the first wireless network node.

21. The apparatus of claim 19, wherein the request message contains information indicating multiple wireless nodes should respond to the request message with responses staggered in time.

22. The apparatus of claim 19, wherein the request message contains information indicating multiple wireless nodes should respond to the request message simultaneously.

23. The apparatus of claim 18, further comprising means for receiving a list of available channels from multiple nodes on a single primary communications channel simultaneously as an uplink SDMA transmission.

24. The apparatus of claim 18, wherein the means for transmitting the downlink packets to the at least one wireless network node on the second channel is further configured to simultaneously transmit the downlink packets to at least two of the wireless network nodes on the second channel via the SDMA scheme.

25. The apparatus of claim 18, further comprising:
means for receiving acknowledgement messages from multiple nodes on a single primary communications channel simultaneously as an uplink SDMA transmission.

26. An apparatus for exchanging packet transmissions in a multi-channel wireless communications system, comprising:
means for sending an identification of one or more channels available for communicating with a plurality of wireless network nodes as an uplink spatial division multiple access (SDMA) transmission;
means for receiving a schedule based on the one or more channels identified; and
means for receiving a downlink SDMA transmission on at least one of the identified channels.

27. The apparatus of claim 26, further comprising means for receiving a request message requesting the identification of one or more channels available for communicating with the wireless network nodes.

28. The apparatus of claim 27, wherein the request message comprises at least one of a multicast message or a broadcast message transmitted to multiple wireless network nodes.

29. The apparatus of claim 27, wherein the request message contains information indicating multiple wireless nodes should respond to the request message simultaneously.

30. The apparatus of claim 27, wherein the request message contains information indicating multiple wireless nodes should respond to the request message with responses staggered in time.

31. The apparatus of claim 27, wherein the request message indicates the identification of channels from multiple nodes should be sent on a single primary communications channel.

32. The apparatus of claim 27, further comprising:
means for responding to the request message with a clear to send (CTS) message having a format compatible with one or more of the IEEE 802.11 family of standards.

33. An apparatus for scheduling packet transmissions in a multi-channel wireless network, comprising:
means for receiving an uplink spatial division multiple access (SDMA) transmission identifying channels available for communicating with a plurality of wireless network nodes;
means for determining schedules indicating packet transmissions for different wireless network nodes among the plurality of wireless network nodes based on the identified available channels, wherein the schedules are determined based on the available channels identified by a corresponding wireless network node and available channels identified by other wireless network nodes; and
means for communicating the schedules to the wireless network nodes.

34. An apparatus for exchanging packet transmissions in a multi-channel wireless network, comprising:
means for sending, from at least one wireless network node, an identification of two or more channels available for communicating with the wireless network;
means for receiving a schedule for communicating with the wireless network from the wireless network, the received schedule generated based on the identification of the two or more available channels; and
means for communicating between the at least one wireless network node and the wireless network on at least two of the identified two or more available channels simultaneously according to the received schedule.

35. An apparatus for scheduling packet transmissions in a multi-channel wireless communications system, comprising:
a receiver configured to receive an identification of channels available for communicating simultaneously with a plurality of wireless network nodes via a spatial division multiple access (SDMA) scheme;
a scheduler configured to determine a schedule for packet transmission for the plurality of wireless network nodes based on the identification of the available channels; and
a transmitter configured to:
transmit the schedule to each of the plurality of wireless network nodes;
transmit downlink packets to one or more of the wireless network nodes on a first channel simultaneously via the SDMA scheme and according to the channel schedule; and
transmit downlink packets to at least one of the wireless network nodes on a second channel according to the transmitted schedule and simultaneously with the downlink packets transmitted on the first channel.

36. An apparatus for exchanging packet transmissions in a multi-channel wireless communications system, comprising:
a transmitter configured to send an identification of one or more channels available for communicating with a plurality of wireless network nodes as an uplink spatial division multiple access (SDMA) transmission; and
a receiver configured to:
receive a schedule based on the one or more channels identified, and
receive a downlink SDMA transmission on at least one of the identified channels.

37. An apparatus for scheduling packet transmissions in a multi-channel wireless network, comprising:

a receiver configured to receive an uplink spatial division multiple access (SDMA) transmission identifying channels available for communicating with a plurality of wireless network nodes;

a scheduler configured to determine schedules indicating packet transmissions for different wireless network nodes among the plurality of wireless network nodes based on the identified available channels, wherein the schedules are determined based on the available channels identified by a corresponding wireless network node and available channels identified by other wireless network nodes; and a transmitter configured to communicate the schedules to the wireless network nodes.

38. An apparatus for exchanging packet transmissions in a multi-channel wireless network, comprising:

a transmitter configured to send, from at least one wireless network node, an identification of two or more channels available for communicating with the wireless network;

a receiver configured to receive a schedule for communicating with the wireless network from the wireless network, the received schedule generated based on the identification of the two or more available channels; and logic configured to communicate between the at least one wireless network node and the wireless network on at least two of the identified two or more available channels simultaneously according to the received schedule.

39. A non-transitory computer-program product for scheduling packet transmissions in a multi-channel wireless network comprising a computer readable medium having instructions stored thereon, the instructions being executable by one or more processors and the instructions comprising instructions for:

receiving an identification of channels available for communicating simultaneously with a plurality of wireless network nodes via a spatial division multiple access (SDMA) scheme;

determining a schedule for packet transmission for the plurality of wireless network nodes based on the identification of the available channels and selection of the available channels by the wireless network;

transmitting the schedule to each of the plurality of wireless network nodes;

transmitting downlink packets to one or more of the wireless network nodes on a first channel simultaneously via the SDMA scheme and according to the transmitted schedule; and transmitting downlink packets to at least one of the wireless network nodes on a second channel according to the transmitted schedule, wherein the downlink packets are transmitted on the second channel simultaneously with the downlink packets transmitted on the first channel.

40. A non-transitory computer-program product for exchanging packet transmissions in a multi-channel wireless network comprising a computer readable medium having instructions stored thereon, the instructions being executable by one or more processors and the instructions comprising instructions for:

sending an identification of one or more channels available for communicating with a plurality of wireless network nodes as an uplink spatial division multiple access (SDMA) transmission;

receiving a schedule based on the one or more channels identified; and receiving a downlink SDMA transmission on at least one of the identified channels.

41. A non-transitory computer-program product for scheduling packet transmissions in a multi-channel wireless network comprising a computer readable medium having instructions stored thereon, the instructions being executable by one or more processors and the instructions comprising instructions for:

receiving an uplink spatial division multiple access (SDMA) transmission identifying channels available for communicating with a plurality of wireless network nodes;

determining schedules indicating packet transmissions for different wireless network nodes among the plurality of wireless network nodes based on the identified available channels, wherein the schedules are determined based on the available channels identified by a corresponding wireless network node and available channels identified by other wireless network nodes; and communicating the schedules to the wireless network nodes.

42. A non-transitory computer-program product for exchanging packet transmissions in a multi-channel wireless network comprising a computer readable medium having instructions stored thereon, the instructions being executable by one or more processors and the instructions comprising instructions for:

sending, from at least one wireless network node, an identification of two or more channels available for communicating with the wireless network;

receiving a schedule for communicating with the wireless network from the wireless network, the received schedule generated based on the identification of the two or more available channels; and communicating between the at least one wireless network node and the wireless network on at least two of the identified two or more available channels simultaneously according to the received schedule.

* * * * *